(No Model.)
J. OUTHET.
TILL LOCK.
No. 439,548. Patented Oct. 28, 1890.
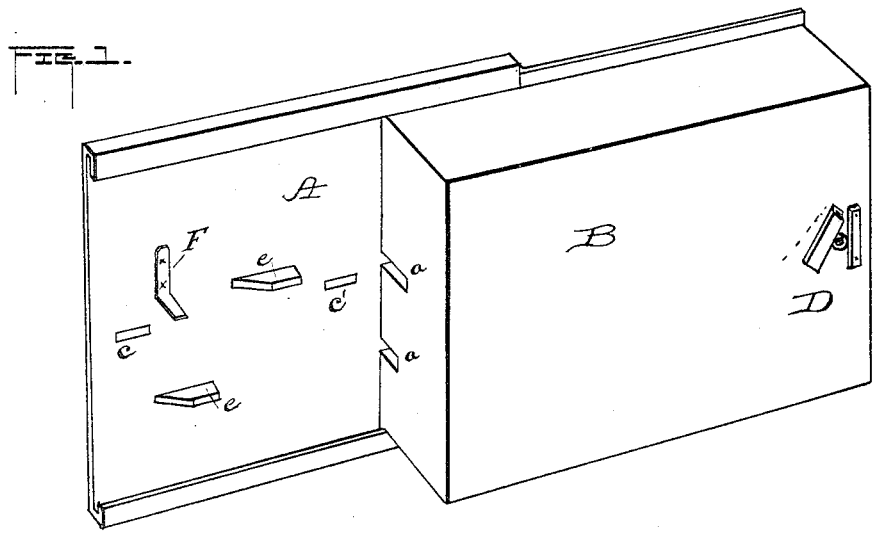
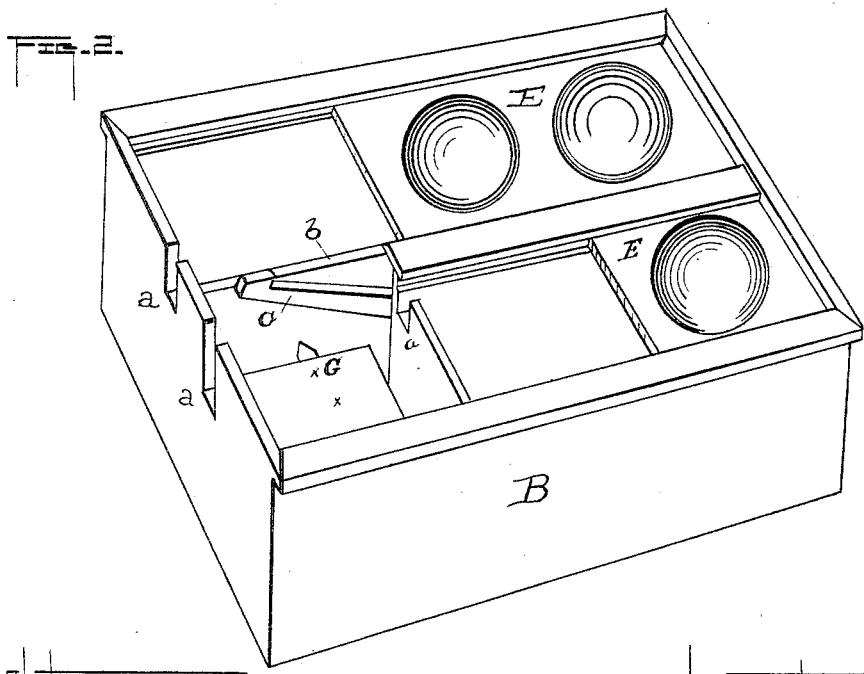

UNITED STATES PATENT OFFICE.

JOHN OUTHET, OF TORONTO, CANADA.

TILL-LOCK.

SPECIFICATION forming part of Letters Patent No. 439,548, dated October 28, 1890.

Application filed July 14, 1890. Serial No. 358,773. (No model.)

*To all whom it may concern:*

Be it known that I, JOHN OUTHET, of the city of Toronto, in the county of York and Province of Ontario, Dominion of Canada, have invented a new and useful Self-Locking Alarm-Till, of which the following is a specification.

My improvement relates to self-locking tills; and the invention consists in the peculiar construction, arrangement, and combinations of parts hereinafter more particularly described, and then definitely claimed.

In the accompanying drawings, Figure 1 shows a perspective view of the bottom of the till and top of the same with till partly open; and Fig. 2 is a perspective view of the till, taken from the rear and side.

In the drawings, A, Fig. 1, shows the under side of the top or cover of the till, in which are the holes $c$, in which the catch C enters and locks the till when shut, and $c'$ in which the said catch enters and prevents the till from being accidentally or unintentionally drawn out altogether and causing the contents of the till to be spilled, and the till, which is divided by the partition $b$, as shown in Fig. 2, extending from front to rear, to which is attached the catch C, which at the top or upper end has a hook shape and at the bottom or lower end has a knob or button, which projects into a hole in the bottom of the till B at the front, where it may be pressed with the finger on opening the till, so as to bring the catch C out of the hole $c$ or $c'$, where it is held by means of an ordinary spring. The said catch may be made of hard wood, iron, or other durable material, and is of one piece, attached to the said partition by a screw near the center.

The projection F from the top of the till when the till is opened or closed catches on the handle of the alarm G and sounds it. When the till is closed, the slides E, in which the silver and coppers are usually kept, come against the projections from the top of the till $e$, which are stationary, and thus the slides E are closed over the apartments below them, where bank-notes and other valuables are kept, so that when the till is again opened the said bank-notes and valuables are not in view. The slide or cap D may be closed over the knob or button of the catch C when the till is closed, and thus hinder and delay the sneak-thief or till-tapper by covering the opening apparatus or any part thereof from view. The usual knob on the front of the till (not shown) also misleads as to the way of opening the till. The incisions $a$ in the rear end of the till are for the purpose of allowing the projections F and $e$ to pass through when the till is being opened or closed.

I do not describe the alarm-bell, as I make no claim to the invention thereof; but What I do claim is—

1. The combination, with a till, as B, having catch C, of the cover A, having holes $c\ c'$, substantially as described.

2. The combination, with a till, as B, having a cover A with holes $c\ c'$, of the catch C, one end engaging said holes $c\ c'$ and the other end entering a hole in the bottom of the till, and the cap D, covering said other end, substantially as described.

JOHN OUTHET.

Witnesses:
THOMAS PARKER,
C. E. CULLEY.